No. 848,141. PATENTED MAR. 26, 1907.
F. H. TREFTZ.
METAL SASH BAR.
APPLICATION FILED OCT. 17, 1906.
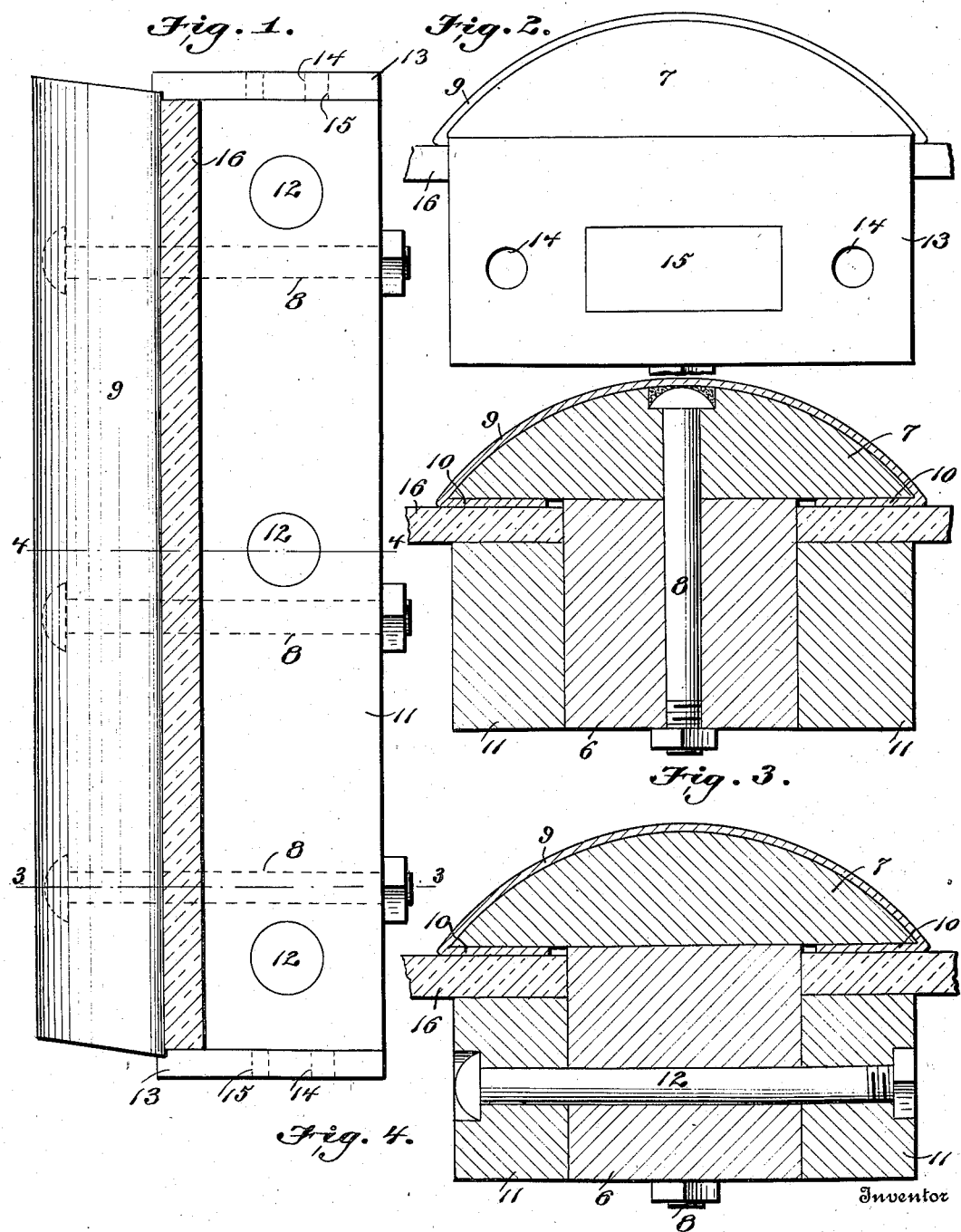

UNITED STATES PATENT OFFICE.

FRED H. TREFTZ, OF CHICAGO, ILLINOIS.

METAL SASH-BAR.

No. 848,141.     Specification of Letters Patent.     Patented March 26, 1907.

Application filed October 17, 1906. Serial No. 339,387.

*To all whom it may concern:*

Be it known that I, FRED H. TREFTZ, a citizen of the United States, residing at Chicago, in the county of Cook and State of Illinois, have invented new and useful Improvements in Metal Sash-Bars, of which the following is a specification.

This invention is a metal sash-bar suitable particularly for show-windows or other large windows, and has for its object to produce a construction by means of which the glass may be set from either the inside or the outside of the window. Glass can be set from the inside of the window when the window is built; but afterward it is often advantageous to set the glass from the outside, as there is then no necessity for disturbing the furniture or fixtures within the window. Many of such sash-bars are made of brass, and a feature of the present invention is to decrease the expense thereof by providing an iron bar with a brass or copper cover.

A further feature of the invention is that the face of the bar is free from screws or the like, thereby giving the bar a neat appearance.

The invention is illustrated in the accompanying drawings, in which—

Figure 1 is a side or edge view of the bar. Fig. 2 is an end view. Fig. 3 is a section on the line 3 3, and Fig. 4 is a section on the line 4 4, of Fig. 1.

Referring specifically to the drawings, the construction of the sash-bar embraces an inside vertical bar 6 and an outside vertical bar 7, connected together by bolts 8, extending therethrough. The heads of these bolts are sunk in the bar 7 and the holes soldered over, so that the outer surface of said bar is made smooth and the bolts are immovably fixed to the bar.

The outside bar 7 receives a cover 9, of thin sheet metal, such as brass or copper, plated or otherwise, and the edges of this cover are turned in under the edges of the bar 7, as indicated at 10.

The inside piece 6 is provided at each side with removable side bars 11, which are secured to the bars 6 by cross-bolts 12, the heads and nuts of which are preferably countersunk, the bolts extending through all three of the bars.

At its ends the bar is provided with socket or end plates 13, provided with holes 14, whereby they may be screwed to the casing, and these plates have recesses to receive bosses 15 on the ends of the bar 6 to hold the parts in place.

To set the glass (indicated at 16) from the inside, the bolts 12 are removed and the side pieces 11 taken off. This allows the plates of glass to be set in against the bar 7. To set the glass from the outside, the nuts of the bolts are removed, and the bar 7 can then be removed and the glass plates set in against the side pieces 11 and the front bar replaced. The inside bar 6 does not have to be moved in either case, but can remain in its fixed position.

I claim—

1. A sash-bar comprising an outside bar, a covering thereon with its edges clamped under the edge of the bar, an inside bar between the edges of the glass panes, bolts connecting the outside and inside bars and extending through the latter, the heads of the bolts being under the covering and their threaded ends being provided with nuts bearing against the inside bar, and side bars removably attached to the opposite sides of the inside bar.

2. A sash-bar comprising a bar fixed at its ends to the sash-casing, a removable outside bar attached to said bar, and removable side bars attached to said fixed bar, panes being held between the outside and side bars and the attaching means for both the outside and the side bars being accessible and detachable from the inside of the sash, so that either the outside or the side bars can be removed and the panes inserted from either the outside or the inside without disturbing the fixed bar.

3. The combination of a pair of socket-plates adapted to be set in the casing, an inside bar the ends of which engage in the sockets, an outside bar and side bars attached to the inside bar, and glass panes clamped between the outside bar and the side bars.

In testimony whereof I have signed my name to this specification in the presence of two subscribing witnesses.

FRED H. TREFTZ.

Witnesses:
    NELLIE FELTSKOG,
    WM. J. ROBINSON.